United States Patent [19]

Behrens

[11] 4,062,797
[45] Dec. 13, 1977

[54] STABILIZED ACCELERATOR COMPOSITIONS

[75] Inventor: Rudolf Adolf Behrens, Gladstone, N.J.

[73] Assignee: American Cyanamid Company, Stamford, Conn.

[21] Appl. No.: 690,128

[22] Filed: May 26, 1976

Related U.S. Application Data

[63] Continuation-in-part of Ser. No. 606,266, Aug. 20, 1975, abandoned, which is a continuation of Ser. No. 430,865, Jan. 4, 1974, abandoned.

[51] Int. Cl.² .................................................. C09K 3/00
[52] U.S. Cl. ..................................... 252/182; 252/403; 252/407; 260/79.5 C; 260/785; 260/792; 260/793
[58] Field of Search ........................ 252/182, 403, 407; 260/792, 793, 785, 795 C

[56] References Cited

U.S. PATENT DOCUMENTS

| 2,376,339 | 5/1945 | Browning et al. | 260/79.5 C |
| 2,850,553 | 9/1958 | Roberts | 260/785 |
| 2,863,867 | 12/1958 | Cherlow | 260/785 |
| 3,297,626 | 1/1967 | Smith | 260/785 |
| 3,544,492 | 12/1970 | Taylor et al. | 260/785 |
| 3,579,460 | 5/1971 | Kerwood | 252/182 |
| 3,718,628 | 2/1973 | Boyer et al. | 260/793 |
| 3,852,250 | 12/1974 | Maxey | 260/785 |
| 3,919,179 | 11/1975 | Maxey | 260/793 |

Primary Examiner—Benjamin R. Padgett
Assistant Examiner—Deborah L. Kyle
Attorney, Agent, or Firm—Frank M. Van Riet

[57] ABSTRACT

The present invention relates to an improved vulcanization accelerator composition. More particularly, it relates to storage stable blends of accelerators, particularly benzothiazole sulfenamides and thiuram sulfides, and to a method for their preparation.

21 Claims, No Drawings

STABILIZED ACCELERATOR COMPOSITIONS

CROSS-REFERENCE TO RELATED APPLICATIONS

This application is a continuation-in-part of my abandoned application Ser. No. 606,266, filed Aug. 20, 1975, which, in turn, is a continuation of my abandoned application Ser. No. 430,865, filed Jan. 4, 1974.

BACKGROUND OF THE INVENTION

It is well known that in the manufacture of rubber products crude or raw rubber is compounded with various ingredients, among which are sulfur and vulcanization accelerators. The primary function of an accelerator is to increase the rate of the vulcanization reaction. In addition, the accelerator must be of such a nature that it provides sufficient time to enable admixture with the rubber at an elevated temperature before vulcanization commences. This is commonly referred to as scorch time. Secondary effects are almost of equal importance and include improved tensile strength properties, set, hysteresis, and ageing, among others. The compounder is likely to be concerned with scorch behavior, cure rate, the extent and time of vulcanization, compatibility, and the like, when using any one or a combination of accelerators in a vulcanization process.

Since some accelerators have too slow a cure rate when used alone, they may require the use of an additive to speed up or activate the cure rate. This can be achieved by adding small amounts of another accelerator, commonly referred to as an activator. The accelerators which most commonly require activation are the thiazoles, including benzothiazole-2-sulfenamides, while those most commonly used as activators are the thiuram sulfides, dithiocarbamates, and guanidines. The primary accelerators, including the benzothiazole-2-sulfenamides, are usually employed in a concentration of about one or two parts per hundred of rubber, while the activators are employed in a concentration of about 0.1 to 0.25 parts per hundred of rubber. This has led to the characterization of the activators as secondary accelerators.

Among the primary accelerators, sulfenamides, particularly benzothiazole-2-sulfenamides, are widely used in the vulcanization of a wide range of rubber compositions. They are frequently used in combination with thiuram sulfides as secondary accelerators. The latter are powerful activators and produce a strong activating effect even at very low concentration. Consequently, they tend to be scorchy, that is, they cause premature vulcanization. The effect of both factors is to use the activators in small amounts. A ratio of 5–10 to 1 of thiazole sulfenamide to activator is common. Since they are such powerful activators, small weighing errors as well as incomplete dispersion in rubber can, and sometimes does, lead to serious consequences, causing undercured parts or premature vulcanization (scorched stock).

From time to time in the past, interest has been generated on the part of both compounders and suppliers in pre-blended mixtures of primary accelerators and activators in the proper, commonly used weight ratios. They have generally not been acceptable for use because such blends have tended to be unstable on storage, losing a very significant amount of accelerator activity in a relatively short time, particularly at moderately elevated temperatures. The loss of activity if manifested most significantly in rate of cure, that is, the accelerator blends require extended vulcanization times to develop optimum physical properties. Thus, the desired effect of the activator, i.e., to give shorter cure time, is lost. Often times the extent of cure and scorch time are affected to a similar degree. In this case, not only is the cure rate lower, but the stock becomes more scorchy, or prone to premature vulcanization. The state of cure is often lower as well. Thus, while many primary accelerators, particularly benzothiazole-2-sulfenamides, are not highly storage stable, their blends with thiurams are much less stable.

Interest in such blends persists, nonetheless, and the present invention represents the culmination of investigations directed to finding means for stabilizing accelerator blends.

Accordingly, it is a primary object of the present invention to provide stable blends of primary accelerators, particularly benzothiazole-2-sulfenamides, and thiuram sulfides.

Another object of this invention is to provide a method for stabilizing blends of primary accelerators, particularly benzothiazole-2-sulfenamides, and thiuram sulfides.

Additional objects and advantages will be set forth in part in the description which follows, and in part will be obvious from the description, or may be learned by practice of the invention, the objects and advantages being realized and obtained by means of the compositions, processes, and improvements particularly pointed out in the appended claims.

THE INVENTION

To achieve the foregoing objects and in accordance with its purpose, this invention as embodied and broadly described, provides a stabilized accelerator composition for rubber comprising a primary accelerator, particularly, a benzothiazole-2-sulfenamide, and a thiuram sulfide, with an effective stabilizing amount of a stabilizer compound selected from the group consisting of (a) polyacrylic acid, (b) carboxylic acids represented by the formula:

$$R-CH=C-COOH$$
$$\phantom{R-CH=C-}|$$
$$\phantom{R-CH=C-}R^1$$

wherein R represents hydrogen, methyl, phenyl or the group —COOH and $R^1$ represents hydrogen or methyl; (c) amides represented by the formula:

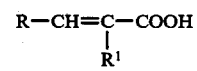

wherein both $R^2$ and $R^3$ represent hydrogen or methyl; $m$ is 1–3 and Z represents —$NH_2$,
—$NHR^4$,
—$N(R^5)_2$,
—$(NH)_2R^6$,
—$(NHCH_2O)_2R^7$ or

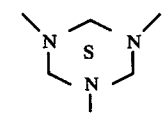

wherein R[4] and R[5] are alkyl, alkoxyalkyl or hydroxymethyl and R[6] and R[7] are alkylene, oxydialkylene or arylene; and (d) esters represented by the formula:

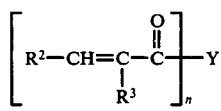

wherein R[2] and R[3] are as defined hereinabove; $n$ is an integer from 1 to 4, provided that
when
$n$ is 1,
Y is —OR[8]
wherein
R[8] is alkyl or alkoxyalkyl;
when
$n$ is 2,
Y is —OR[9]O—
wherein
R[9] is alkylene or oxydialkylene;
when
$n$ is 3,
Y is

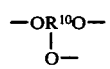

wherein
R[10] is alkylene; and
when
$n$ is 4

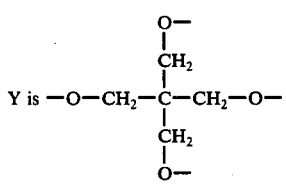

The present invention further provides a process for stabilizing accelerator compositions comprising primary accelerators, particularly benzothiazole-2-sulfenamides, and a thiuram sulfide, which comprises adding to such composition a stabilizing amount of a stabilizer compound as defined hereinabove.

It is to be understood that both the foregoing general description and the following detailed description are exemplary and explanatory and should not be construed as being restrictive of the invention.

For the purposes of the present invention, primary accelerators are defined as compounds represented by the formula:

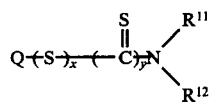

wherein Q represents a benzothiazyl radical

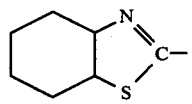

or a morpholinyl group

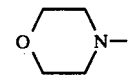

R[11] and R[12] represent hydrogen, alkyl, cyclohexyl or, taken together with the nitrogen atom, combine to form a morpholinyl group; $x$ is 1 or 2 and $y$ is 0 or 1, provided that when $x$ is 1, $y$ is 0 or 1 and when $x$ is 2, $y$ is 0.

Representative primary accelerators in accordance with the above formula include:
2-benzothiazolyl diethyldithiocarbamate
Cyclohexyl-2-benzothiazole sulfenamide
N-tert.butyl-2-benzothiazole sulfenamide
N,N-diisopropyl-2-benzothiazole sulfenamide
N-oxydiethylene-2-benzothiazole sulfenamide
N,N-diethyl-2-benzothiazole sulfenamide
Benzothiazyl morpholinyldisulfide
Bismorpholinyldisulfide
N',N'-[(thiocarbonyl)thio]dimorpholine, and the like.

For the purposes of the invention the term thiuramsulfides includes mono-, to hexasulfides, such as tetramethylthiuram sulfide, tetramethylthiuramdisulfide, tetraethylthiuram disulfide, tetrabutylthiuram monosulfide, dipentamethylene thiuramhexasulfide, dicyclohexamethylenethiuram disulfide, diisopropylthiuram disulfide, pentaethylthiuram disulfide bis(morpholinothiocarbamoyl)disulfide, and the like.

Compounds representative of (b) carboxylic acids, include acrylic acid, methacrylic acid, crotonic acid, cinnamic acid, maleic acid, fumaric acid, and the like.

Compounds representative of (c) amides, include acrylamide, methacrylamide, their N-mono and dialkyl substituted derivatives; N-alkoxyalkylacrylamides and methacrylamides; N-hydroxymethylacrylamide and methacrylamide; alkylenebis-, arylenebis-, and oxydialkylenebisacrylamides and methacrylamides. Representative compounds include N-isopropylacrylamide, N-tert.octylacrylamide, N-tert.butylacrylamide, N-tert.butylmethacrylamide, N,N-dibutylacrylamide, N,N-dioctylacrylamide, N,N-dibutylmethacrylamide, N-isobutoxymethylacrylamide, N,N'-methylenebisacrylamide, N,N'-phenylenebisacrylamide, N,N'-methylenebismethacrylamide, N,N'-hexamethylenebisacrylamide, N,N'-oxydimethylenebisacrylamide, 1,3,5-triacrylylhexahydro-s-triazine, and the like.

Compounds representative of (d) esters, include mono-, bis-, tris- and tetraesters of acrylic acid and methacrylic acid, such as octylacrylate, nonylacrylate, butylmethacrylate, 1,4-butyleneglycoldiacrylate, trimethylolpropane triacrylate, diethyleneglycoldiacrylate, diethyleneglycoldimethacrylate, pentaerythritol tetraacrylate, methoxymethylacrylate, methoxyethylmethacrylate, methoxyethylacrylate, and the like.

The primary accelerators, particularly the benzothiazole-2-sulfenamide accelerators, and their role in the vulcanization process are discussed at length in "Vulcanization of Elastomers", Alliger and Sjothun, Reinhold Publishing Corp., New York, 1964, and "Introduction to Rubber Technology", Morton, Reinhold Publishing Corp., New York, 1959, and numerous other sources. The thiuram sulfides are discussed in Alliger et al. supra.

In practicing the invention, the primary accelerators and thiuram sulfide are blended in any convenient manner consistent with the objects of the invention. The primary accelerators, particularly the benzothiazole-2-sulfenamides, are not highly stable compounds. Therefore, they should not be exposed to high temperatures for too long a period of time. Nevertheless, one method of producing the blends is to melt the primary accelerator, blend in the thiuram, allow the molten blend to cool and either flake or grind the resultant solid for use. The stabilizer can be added to the melt in the same manner as the thiuram. Alternatively, the two or three components may be blended in the molten state, or the components may be partly or entirely dry blended. The method used to prepare the blends is not a critical feature of the invention. However, for practical reasons, the preferred method of preparing the blends is to add the stabilizer to the molten primary accelerator followed by the thiuram; allow the blend in the molten state to cool, and then grind or flake using a conventional flaker-roll device. It will be understood that some primary accelerators are more heat sensitive than others; that not all stabilizers will melt or dissolve in every primary accelerator, and dispersions may sometimes result; that in some instances, for practical reasons, it may be more desirable to dry blend the ingredients.

The blends of accelerators obviously can be prepared in any weight ratio desired without incident, and the amount of stabilizer added may vary over a wide range of concentrations. Ordinarily the activator is used in the rubber composition in an amount of from about 0.1 part to 0.25 part per part of primary accelerators. However, it is understood that the amount of primary accelerator and/or activator, in parts per hundred of rubber stock, which is used in any given rubber composition may vary widely, depending on the properties desired in the vulcanized rubber. Therefore, blends may be prepared which cover a wider range of primary accelerator activator than indicated above. For the purposes of illustration, however, blends covering the range from about 10:1 to about 4:1 primary accelerator to activator are particularly illustrated.

The stablizers used in preparing the blends of this invention will necessarily vary in their effectiveness and some are superior at lower concentrations. Thus, the amount of any stabilizer used to provide a given end result will vary. In speaking of the amount of stabilizer used, for the purpose of this invention the amount will be a weight percent based on the combined weight of the two or more accelerators used in the blend. Thus, stabilized blends may be prepared containing from about 0.25 percent by weight to as high as 50 weight percent, depending on the particular stabilizer. Ordinarily the blends can be stabilized by the addition thereto of from about 1 to 5 weight percent of the stabilizer.

Stabilization of the blends, as defined herein, means any significant improvement in the stability of the blends after storage for a period of time at normal room tempratures, or for a pre-determined time at an elevated temperature in an accelerated aging test which is defined hereinbelow. Improvement in stability, as defined herein, means any significant reduction of the loss of cure rate experienced with the unstabilized blends during a similar period of storage under the same conditions, and/or any significant decrease in the loss of scorch time relative to the unstabilized blends. Unstabilized blends ordinarily suffer degradation on storage over a period of time such that their use in a vulcanization results in a slower cure and oftentimes a reduction in scorch time. This is often manifested in the vulcanized product by slower development of optimum modulus properties and in many cases the extent of the full cure may be affected, i.e., the optimum properties may not be attained.

Cure rate is determined by use of a Monsanto Oscillating Disc Rheometer and is reported as the maximum slope of the cure curve in inch-pounds per 0.5 minute operating against an oscillating disc embedded in the rubber stock undergoing vulcanization.

Mooney Scorch time is the elapsed time from the onset of the heating cycle to the start of vulcanization (the induction period). With reference to the cure curve traced by the Mooney Viscometer, scorch is reported as $t_5$, which is the time in minutes, from one minute after the start of heating, for a five point rise in the cure curve above the minimum in the curve, at the temperature of the test, which is usually chosen to represent maximum processing temperature of the unvulcanized rubber compound.

The blends prepared in accordance with this invention are evaluated, as discussed above, in terms of their improvement over an unstabilized blend after a period of ageing. It is difficult to determine what constitutes normal storage conditions, in terms of the physical form of storage (drums, fiber packs, paper bags, etc.), the length of storage in days, weeks or months, or the temperature of storage (air-conditioned warehouses or exposure to ambient temperature in the warmer climates). In order to evaluate the blends by a reasonable set of conditions, unless otherwise stated, the blends were stored in closed containers for (a) two weeks at normal room temperature (25°-30° C.), (b) for 13 weeks at normal room temperature and (c) for three weeks at 50° C., representing the most adverse conditions. The blends were then evaluated in a standard rubber formulation as described in the examples.

In addition to the accelerators and stabililizer compound it may often times be desirable to include in the blend an inert carrier material, such as hydrated silica, magnesium silicate and the like. When so used, the blend may contain up to 50 percent by weight of such material or as low as 1.0 percent, to achieve improvements in the physical form of the blends, such as providing flakes or dustless, free-flowing powders, or to improve dispersibility.

Moreover, it has been found that the blends of accelerators stabilized in accordance with this invention may also contain other conventional vulcanization components, such as zinc oxide, sulfur, and the like without any deleterious effect on the blends or their properties such as Mooney Scorch time or cure rate.

In the examples which follow, the stabilized blends of accelerators were evaluated for effectiveness using the rubber masterbatch shown (which contains 100 parts rubber stock).

| Masterbatch | Parts |
| --- | --- |
| Styrene-butadiene rubber (SBR-1712), oil-extended | 96.3 |
| Cis-4 Polybutadiene (Phillips Petroleum Co.) | 30.0 |
| Vulcan 5H Carbon Black (ASTM Type N-285, Cabot Corp.) | 70.0 |

-continued

| Masterbatch | Parts |
|---|---|
| Aromatic hydrocarbon Oil (Sundex 790, Sun Oil Co.) | 13.7 |
| Zinc oxide | 5.0 |
| Stearic acid | 2.0 |
| N-phenyl-N'-(1,3-dimethyl-butyl)-p-phenylenediamine | 1.0 |
| Sulfur | 1.8 |

The following examples are provided for illustrative purposes and may include particular features of the invention. However, the examples should not be construed as limiting the invention, many variations of which are possible without departing from the spirit or scope thereof.

EXAMPLE I

A blend was prepared, consisting of 80 weight percent of N-oxydiethylene benzothiazole-2-sulfenamide and 20 weight percent of tetramethylthiuram monosulfide, by melting the sulfenamide, mixing the stabilizer set forth below into the molten sulfenamide in the amounts specified and then adding the thiuram sulfide; allowing the molten blend to cool to room temperature, and grinding the solidified mixture in a mortar and pestle. The thus prepared blends, including blends containing no stabilizer, were stored in closed containers for the period of time indicated prior to evaluation. After storage, the blends were compounded into separate portions of the rubber masterbatch on a rubber mill, using conventional procedures. Cure rate and Mooney scorch data were obtained, as described, at 316° F. and 270° F., respectively.

The blends were stored (a) for 2 weeks at normal room temperature and (b) for 4 weeks at 50° prior to testing. The compounds evaluated as stabilizers were:
1. Oxydimethylenebis Acrylamide
2. 1,4-butyleneglycol Diacrylate
3. Diethylene Glycol Diacrylate
4. 1,3,5-Triacrylylhexahydro-s-Triazine The compounds were added to the blend at 4 percent by weight (0.028 part/0.7 part 80:20 blend) and evaluated in the masterbatch rubber composition as described. Data are shown in Table 1.

Table 1

| Stabilizer | Compositions | | | | |
|---|---|---|---|---|---|
| | (1) | (2) | (3) | (4) | (5)[1] |
| Mooney Scorch 270° F, $t_5$, Min. | | | | | |
| (a) | 31.0 | 33.2 | 33.6 | 33.4 | 34.4 |
| (b) | 28.2 | 32.8 | 33.9 | 33.2 | 22.2 |
| Max. Cure Rate 316° F, In.Lbs./Min. | | | | | |
| (a) | 3.15 | 3.50 | 3.30 | 3.30 | 3.2 |
| (b) | 1.95 | 2.70 | 2.55 | 2.40 | 0.6 |
| % Loss Cure Rate | 38 | 26 | 23 | 27 | 80 |

[1]Control, stored under the same conditions

The data illustrate that all the stabilized blends retained a significant degree of activity following storage for one month at 50° C., as evidenced by retention of cure rate and scorch time.

EXAMPLE II

Following the procedure of Example I, blends were stabilized with (1) 1 percent and (2) 2 percent by weight of oxydimethylenebisacrylamide. The blends were stored for (a) 3 days at room temperature and (b) 6 months at room temperature prior to testing. Data are given in Table 2.

Table 2

| | Weight % Stabilizer | | |
|---|---|---|---|
| | Control | 1% | 2% |
| Mooney Scorch, 270° F, $t_5$, min. | | | |
| (a) | 31.9 | 30.8 | 31.6 |
| (b) | 16.8 | 27.3 | 26.8 |
| Max. Cure Rate 316° F, in. lbs./Min. | | | |
| (a) | 3.4 | 3.7 | 3.4 |
| (b) | 0.8 | 3.5 | 3.4 |

The data show that effective stabilization is imparted to the blend by as low as 1 percent oxydimethylene bisacrylamide.

EXAMPLE III

Following the procedure of Example I, the blends were compounded into separate portions of the masterbatch and evaluated. Data are shown in Table 3.

Table 3

| Stabilizer | Composition No., parts per hundred rubber | | | | |
|---|---|---|---|---|---|
| | A | B | C | D | E |
| None | — | | | | |
| Ethylenedimethacrylate | | .028 | | | |
| 1,3-Butyleneglycoldiacrylate | | | .028 | | |
| Diethyleneglycoldiacrylate | | | | .028 | |
| Trimethylolpropane trimethacrylate | | | | | .028 |
| Mooney Scorch at 270° F., $t_5$, minutes | | | | | |
| a) original* | 34.4 | 33.0 | 33.2 | 33.6 | 33.7 |
| b) stored 3 mos. at R.T. | 18.6 | 28.0 | 26.7 | 26.6 | 27.9 |
| Monsanto Oscillating Disc Rheometer at 316° F.; Max. Cure Rate | | | | | |
| a) original* | 3.2 | 3.4 | 3.5 | 3.3 | 3.5 |
| b) stored 3 mos. at R.T. | 1.3 | 3.2 | 2.8 | 3.1 | 3.0 |

*Blend stored 2 weeks at R.T. before testing

EXAMPLE IV

Following the procedure of Example I, the blends were compounded into separate portions of the Masterbatch and evaluated. Data are shown in Table 4.

TABLE 4

| Stabilizer | Compositions parts per hundred rubber | | | |
|---|---|---|---|---|
| | A | B | C | D |
| None | — | | | |
| Acrylamidomethyl-salicylic Acid[1] | | .028 | | |
| 1,4-Butanedi(oxymethyl)acrylamide[2] | | | .028 | |
| Oxydi(ethylene oxy methyl)acrylamide[3] | | | | .028 |
| Mooney Scorch at 270° F, $t_5$, minutes | | | | |
| (a) original[4] | 34.4 | 32.7 | 33.2 | 32.9 |
| (b) Stored 3 months at room temperature | 18.6 | 22.4 | 26.7 | 27.0 |
| Monsanto Oscillating Disc Rheometer | | | | |
| (a) Original[4] | 3.2 | 3.0 | 3.2 | 3.2 |
| (b) Stored 3 months at room temperature | 1.3 | 2.3 | 2.8 | 2.9 |

TABLE 4-continued

| Stabilizer | Compositions parts per hundred rubber | | | |
|---|---|---|---|---|
| | A | B | C | D |
| (1) | OH COOH (benzene ring) (CH₂NHC—CH=CH₂)1.5 ‖ O | | | |
| (2) | [CH₂=CHCNHCH₂OCH₂CH₂]₂ ‖ O | | | |
| (3) | [CH₂=CHCNHCH₂OCH₂CH₂]₂—O ‖ O | | | |

(a)blend stored 2 weeks at room temperature before testing.

EXAMPLE V

Following the procedure of Example I, the blends were compounded into separate portions of the Masterbatch and evaluated. Data are shown in Table 5.

TABLE 5

| Stabilizer | A | B | C | D | E | F | G | H | J[1] | K[2] |
|---|---|---|---|---|---|---|---|---|---|---|
| None | — | | | | | | | — | | |
| Pentaerythritol tetraacrylate | | .028 | .014 | | | | | | | |
| Trimethylolpropane triacrylate | | | | .028 | .014 | | | | | |
| Acrylamide | | | | | | 0.14 | | | | |
| Methylolacrylamide | | | | | | | 0.14 | | | |
| Crotonic Acid | | | | | | | | 0.14 | | |
| 1,3-butyleneglycoldiacrylate | | | | | | | | | | .028 |
| Mooney Scorch, t₅, minutes at 270° F. | | | | | | | | | | |
| (a) original[2] | 25.2 | 26.6 | 25.3 | 25.6 | 25.4 | 26.0 | 25.0 | 17.4 | 16.0 | 20.8 |
| (b) 1 month at 45° C. | 17.0 | 25.0 | 21.6 | 24.0 | 17.0 | 14.5 | 14.4 | 14.9 | 13.8 | 14.5 |
| Monsanto Oscillating Disc Rheometer at 316° F. | | | | | | | | | | |
| (a) original[2] | 3.15 | 3.15 | 3.15 | 2.95 | 3.10 | 2.85 | 2.55 | 24.0 | 1.90 | 1.60 |
| (b) 1 month at 45° C. | 0.85 | 3.80 | 2.95 | 3.75 | 1.40 | 2.0 | 2.40 | 1.50 | 1.15 | 2.10 |
| Maximum Torque | | | | | | | | | | |
| (a) original[2] | 47.0 | 45.7 | 45.5 | 43.2 | 44.6 | 44.8 | 43.3 | 42.4 | 43.8 | 41.5 |
| (b) 1 month at 45° C. | — | 50.5 | 48.3 | 49.7 | 42 | 41.0 | 41.8 | 38 | — | 44.6 |

[1]Blend of 80:20 - N-oxydiethylene benzothiazole sulfenamide and dipentamethylene thiuram tetrasulfide.
[2]Stood 3 weeks at room temperature before testing.

EXAMPLE VI

Following the procedure of Example I, the blends were compounded into separate portions of the masterbatch and evaluated. Data are shown in Table 6.

TABLE 6

| Stabilizer | A | B | C |
|---|---|---|---|
| None | — | | |
| 1-Methylheptadecylacrylamide | | .028 | |
| N,N'-p-methoxybenzylidenebisacrylamide | | | .0042 |
| Mooney Scorch, t₅, Min., at 270° F. | | | |

TABLE 6-continued

| Stabilizer | A | B | C |
|---|---|---|---|
| (a) original | 25.6 | 28.6 | 27.6 |
| (b) 3 months at room temperature | 16.1 | 19.1 | 17.0 |
| Monsanto Oscillating Disc Rheometer at 316° F. Maximum Cure Rate | | | |
| (a) original | 3.0 | 3.5 | 3.4 |
| (b) 3 months at room temperature | 1.25 | 1.95 | 1.5 |

EXAMPLE VII

Following the procedure of Example I, the blends were compounded into separate portions of the Masterbatch and evaluated. Data are given in Table 7.

Table 7

| Stabilizer | A | B | C | D | E |
|---|---|---|---|---|---|
| None | — | | | | |
| Pentaerythritol triacrylate | | 0.14 | 0.028 | | |
| N,N'-butylidenebisacrylamide | | | | 0.14 | |
| N,N'-(o-phenylenebis)acrylamide | | | | | 0.056 |
| Mooney Scorch, t₅, min. at 270° F. | | | | | |
| (a) original | 24.6 | 25.9 | 25.9 | 24.2 | 26.9 |
| (b) 1 month at 45° C. | 18.2 | 21.4 | 25.1 | 20.4 | 25.1 |
| Monsanto Oscillating Disc Rheometer at 316° F. Max. Cure Rate | | | | | |
| (a) original | 3.6 | 3.4 | 3.3 | 3.3 | 3.1 |
| (b) 1 month at 45° C. | 0.70 | 2.3 | 3.0 | 2.8 | 3.0 |

EXAMPLE VIII

Following the procedure of Example I, the blends were compounded into separate portions of the Masterbatch and evaluated. Data are given in Table 8.

TABLE 8

| Stabilizer | A | B | C | D | E | F | G | H | J |
|---|---|---|---|---|---|---|---|---|---|
| N-tert.butylacrylamide | 0.14 | | | | | | | | |
| N-isopropylacrylamide | | 0.14 | | | | | | | |
| N-tert.octylacrylamide | | | 0.14 | | | | | | |
| Oxydimethylenebisacrylamide | | | | 0.14 | | | | | |
| N-(isobutoxymethyl)acrylamide | | | | | 0.14 | | | | |
| Methylenebisacrylamide | | | | | | 0.14 | | | |
| Methoxyethylacrylate | | | | | | | 0.14 | | |
| Hexamethylenebisacrylamide | | | | | | | | 0.14 | |
| None | | | | | | | | | — |

TABLE 8-continued

| Stabilizer | A | B | C | D | E | F | G | H | J |
|---|---|---|---|---|---|---|---|---|---|
| Mooney Scorch, $t_5$, minutes at 270° F. | | | | | | | | | |
| (8a) 2 weeks at room temperature | 32.4 | 33.8 | 35.0 | 35.8 | 36.0 | 35.2 | 35.7 | 34.3 | 35.0 |
| (b) 3 months at room temperature | 34.0 | 37.0 | 37.8 | 38.0 | 35.8 | 36.8 | 35.9 | 37.4 | 34.1 |
| (c) 6 months at room temperature | 18.0 | 26.0 | 26.6 | 26.4 | 20.5 | 28.1 | 23.7 | 22.1 | 16.5 |
| Monsanto Oscillating Disc Rheometer at 316° F. Maximum Cure Rate | | | | | | | | | |
| (a) 2 weeks at room temperature | 3.1 | 3.0 | 3.1 | 2.8 | 3.0 | 2.8 | 3.2 | 3.0 | 3.1 |
| (b) 3 months at room temperature | 2.5 | 2.7 | 2.7 | 2.5 | 2.5 | 2.7 | 2.8 | 2.6 | 2.1 |
| (c) 6 months at room temperature | 1.2 | 3.2 | 2.5 | 2.5 | 2.1 | 2.8 | 2.7 | 2.2 | 0.8 |

EXAMPLE IX

Blends were prepared consisting of 80:20 wt. percent of N-tert.butyl-2-benzothiazole sulfamide and tetramethylthiuran monosulfide in the manner described in Example I. To a portion of the blend was added 6 percent by weight of pentaerythritol tetraacrylate. The blends were then stored prior to testing. Results are shown in Table 9.

TABLE 9

| Mooney Scorch, 290° F. $t_5$, Minutes | Control | Stabilized |
|---|---|---|
| (a) | 23.0 | 23.1 |
| (b) | 17.8 | 22.9 |
| Max. Cure Rate, 316° F. In. lbs./min. | | |
| (a) | 3.25 | 3.3 |
| (b) | 2.4 | 3.7 |

(a) Stored 2 weeks at normal room temperature
(b) Stored 6 months at 45° C.

The data illustrates that a blend of N-tert.butyl-2-benzothiazole sulfenamide and tetramethylthiuram monosulfide drops significantly in both Mooney Scorch and cure rate on storage whereas the stabilized blend does not change.

EXAMPLE X

Following the procedure of Example IX, blends were prepared consisting of:
1. 80% 2-(Hexamethyleneiminothio)benzothiazole — 20% tetramethylthiuram monosulfide.
2. 80% N-Cyclohexylbenzothiazole-2-sulfenamide — 20% tetramethylthiuram monosulfide.
3. 80% N-oxydiethylenebenzothiazole 2-(sulfenamide — 20% 2-benzothiazolyl diethyldithiocarbamate.

Portions of the blends were stabilized with 6 percent by weight of pentaerythritol tetraacrylate and aged prior to testing. Results are shown in Table 10.

Table 10

| Mooney Scorch, 270° F. $t_5$ minutes | (1) | Composition (2) | (3) |
|---|---|---|---|
| (a) | 23.3(21.8) | 22.4(21.0) | 38.0(37.0) |
| (b) | 22.1(16.4) | — | — |
| (c) | — | 23.2(15.6) | 36.3(27.9) |
| Max. Cure Rate, 316° F. In. lbs./minute | | | |
| (a) | 4.75(4.7) | 3.40(3.45) | 1.45(1.45) |
| (b) | 4.55(3.3) | — | — |
| (c) | — | 3.70(2.25) | 1.35(1.15) |

(a) Stored 2 weeks at normal room temperature.
(b) Stored 2 months at normal room temperature.
(c) Stored 1 month at 45° C.
Note: Numbers in parentheses indicate the control.

EXAMPLE XI

Blends of N-oxydiethylenebenzothiazole-2-sulfenamide and tetramethylthiuram monosulfide were prepared as in Example I. To portions of the blends were added 4% by weight of (a) acrylic acid and (b) polyacrylic acid. The blends were stored for 5½ months at normal room temperature prior testing. Results are shown in Table 11.

Table 11

| Max. Cure Rate, 316° F. In.lbs./minute | Composition(a) | Composition(b) |
|---|---|---|
| Original | 3.30(3.4) | 3.35(3.4) |
| Aged | 2.0 (0.20) | 3.55(0.20) |

Note: Numbers in parentheses indicate control.

EXAMPLE XII

A blend of 80% by weight of N,N'-[(thiocarbonyl)-thio]-dimorpholine and 20% by weight of tetramethylthiuram monosulfide was prepared in the manner described in Example I. To a portion of the blend was added 4 percent by weight of pentaerythritol tetraacrylate and the blends aged for (a) 1 month and (b) 2 months at 45° C. prior to testing.

Table 12

| Mooney Scorch, 270° F. $t_5$, minutes | Control | Stabilized |
|---|---|---|
| Original | 18.6 | 18.8 |
| 1 Mo. at 45° C. | 13.3 | 18.8 |
| 2 Mo. at 45° C. | 8.6 | 16.4 |
| Max. Cure Rate, 316° F. In. lbs./minute | | |
| Original | 4.8 | 4.8 |
| 1 Mo. at 45° C. | 4.6 | 5.0 |
| 2 Mo. at 45° C. | 2.3 | 5.0 |

I claim:
1. A stabilized accelerator composition for rubber comprising (a) a primary accelerator compound represented by Formula (I):

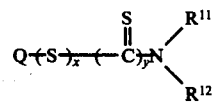

wherein Q represents a benzothiazyl or morpholinyl radical; $R^{11}$ and $R^{12}$ are, individually, selected from hydrogen, alkyl, cycloalkyl or taken together with the nitrogen atom, combine to form a 5- or 6- membered heterocyclic ring; $x$ is 1 or 2 and $y$ is 0 or 1, provided that when $x$ is 2, $y$ is 0; (b) a thiuram sulfide and (c) an effective stabilizing amount of a compound selected from the group consisting of (1) polyacrylic acid, (2) carboxylic acids represented by Formula (II):

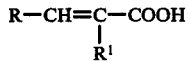

wherein R represents hydrogen, methyl, phenyl or a -COOH group and $R^1$ is hydrogen or methyl; (3) amides represented by the Formula (III):

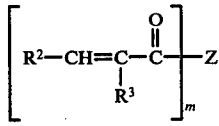

wherein $R^2$ and $R^3$ are, individually, hydrogen or methyl, $m$ is an integer from 1-3, inclusive, and Z is selected from $-NH_2$, $-NHR^4$, $-N(R^5)_2$, $-(NH)_2R^6$, $-(NHCH_2O)_2R^7$ or

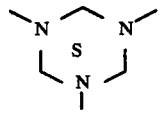

wherein $R^4$ and $R^5$ are, alkyl, alkoxyalkyl or hydroxymethyl, $R^6$ and $R^7$ are, alkylene, arylene or oxydialkylene and (4) esters represented by the Formula (IV):

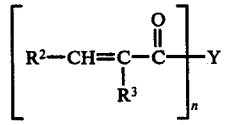

wherein $R^2$ and $R^3$ are as defined above, $n$ is an integer from 1-4, inclusive, provided that when $n$ is 1, Y is $OR^8$ wherein $R^8$ is alkyl or alkoxyalkyl; when $n$ is 2, Y is —$OR^9O$— wherein $R^9$ is alkylene or oxydialkylene; when $n$ is 3, Y is

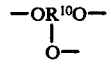

wherein $R^{10}$ is alkylene; and when $n$ is 4, Y is

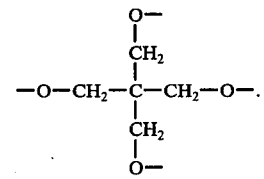

2. The composition of claim 1 wherein Q is benzothiazyl, $x$ is 1 and $y$ is 0.

3. The composition of claim 2 wherein R and $R_1$ combine with the nitrogen atom to form a morpholinyl group.

4. The composition of claim 1 wherein Q wherein Q is benzothiazyl, $x$ is 1, $y$ is 1, and R and $R_1$ are alkyl groups.

5. The composition of claim 4 wherein R wherein $R_1$ are ethyl groups.

6. The composition of claim 1 wherein Q is morpholinyl, $x$ is 1, $y$ is 1.

7. The composition of claim 6 wherein R and $R_1$ combine with the nitrogen atom to form a morpholinyl group.

8. The composition of claim 1 wherein Q is benzothiazyl, $x$ is 2, $y$ is 0 and R and $R_1$ combine with the nitrogen atom to form a morpholinyl group.

9. The composition of claim 1 wherein Q is morpholin, $x$ is 2, $y$ is 0 and R and $R_1$ combine with the nitrogen atom to form a morpholinyl group.

10. The composition of claim 1 wherein the stabilizer is polyacrylic acid.

11. The composition of claim 1 wherein the stabilizer is a carboxylic acid represented by Formula (II).

12. The composition of claim 1 wherein the stabilizer is an amide represented by Formula (III).

13. The composition of claim 1 wherein the stabilizer is an ester represented by Formula (IV).

14. The composition of claim 2 wherein said thiuram sulfide is tetramethylthiuram monosulfide.

15. The composition of claim 14 wherein said stabilizer is a carboxylic acid represented by Formula (II).

16. The composition of claim 14 wherein said stabilizer is an amide represented by Formula (III).

17. The composition of claim 14 wherein said stabilizer is an ester represented by Formula (IV).

18. The composition of claim 17 wherein said ester is pentaerythritol tetraacrylate.

19. The composition of claim 17 wherein said ester is 1,4-butyleneglycoldiacrylate.

20. The composition of claim 17 wherein said ester is pentaerythritol triacrylate.

21. The composition of claim 16 wherein said amide is 1,3,5-triacrylylhexahydro-s-triazine.

* * * * *

UNITED STATES PATENT OFFICE
CERTIFICATE OF CORRECTION

Patent No. 4,062,797        Dated December 13, 1977

Inventor(s) RUDOLF ADOLF BEHRENS

It is certified that error appears in the above-identified patent and that said Letters Patent are hereby corrected as shown below:

Claim 4, line 1, omit the second "wherein Q".

Claim 5, line 1, take out "wherein $R_1$" and substitute therefor -- and $R_1$ --.

Signed and Sealed this

Eleventh Day of April 1978

[SEAL]

Attest:

RUTH C. MASON
*Attesting Officer*

LUTRELLE F. PARKER
*Acting Commissioner of Patents and Trademarks*